United States Patent
Bernardino

[11] Patent Number: 5,882,199
[45] Date of Patent: Mar. 16, 1999

[54] CURVED MAPS

[76] Inventor: Aurelio Bernardino, Av. Nueva Toledo 97-A, Cieneguilla-Lima 40, Peru

[21] Appl. No.: 782,912

[22] Filed: Jan. 13, 1997

[51] Int. Cl.⁶ ............................. G09B 25/06; G09B 29/12
[52] U.S. Cl. ............................................. 434/152; 434/132
[58] Field of Search ...................... 434/132, 135, 434/150, 152

[56] References Cited

U.S. PATENT DOCUMENTS

| | | | |
|---|---|---|---|
| D. 136,173 | 6/1943 | Von Rohl | 434/150 |
| 185,889 | 1/1877 | Bourman | 434/150 |
| 245,757 | 8/1881 | West | 434/150 |
| D. 267,958 | 2/1983 | Watanabe . | |
| 878,308 | 2/1908 | Patesson | 434/152 |
| 1,932,609 | 10/1933 | Swartz | 434/150 |
| 2,406,164 | 8/1946 | Raisz | 434/135 |
| 2,500,952 | 3/1950 | Larson | 434/150 |
| 3,225,461 | 12/1965 | Snyder | 434/132 |
| 3,248,807 | 5/1966 | Janus | 434/135 |
| 3,471,946 | 10/1969 | Ashley . | |
| 3,767,203 | 10/1973 | Eaker | 434/150 |
| 4,494,935 | 1/1985 | Miller | 434/132 |
| 4,627,622 | 12/1986 | Spilhaus . | |
| 4,884,811 | 12/1989 | Devorak . | |
| 4,937,181 | 6/1990 | Robers | 434/152 |
| 5,123,846 | 6/1992 | Lewis | 434/130 |
| 5,217,226 | 6/1993 | Christopher . | |
| 5,222,896 | 6/1993 | Smith, Jr. . | |

FOREIGN PATENT DOCUMENTS

| | | | |
|---|---|---|---|
| 57244 | 4/1946 | Netherlands | 434/135 |
| 560186 | 3/1944 | United Kingdom | 434/135 |

*Primary Examiner*—Paul J. Hirsch
*Attorney, Agent, or Firm*—Spencer & Frank

[57] ABSTRACT

Maps are depicted on curved surfaces to present the shapes of geographical features without the distortion that is inherent in flat maps. In one of the disclosed embodiments, each of two or map posters has a curved map shell representing a geographical feature of interest. The map shells have convex sides and concave sides. In order to permit compact shipping or storage, the map posters are arranged so that the convex side of one map shell faces the concave side of the next map shell.

19 Claims, 4 Drawing Sheets

CURVED MAPS

BACKGROUND OF THE INVENTION

The present invention is directed to maps which accurately represent geographical features of the earth or other celestial bodies, without the expense and space required for a globe and also without the distortions that are inherent in flat maps.

Geographical features are typically depicted either on globes or on flat maps. A globe has the advantage that longitude and latitude lines can be correctly drawn and the scale remains constant, without varying as the latitude changes. However, a globe is relatively expensive and takes up a lot of space, particularly as the size of globe is increased in order permit accurate depiction of relatively small geographical features. Flat maps, on the other hand, are relatively inexpensive, and can really be folded or rolled to a convenient size. Due to the curvature of the earth, however, flat maps give a distorted picture of large-scale geographical features.

The widespread use of flat maps in the field of education is particularly unfortunate because children exposed to flat maps may acquire lasting but nevertheless incorrect ideas about the true geography of the earth. The child may incorrectly get the notion that South America is smaller than North America or even Greenland. It will also be difficult for the child to understand why ships and airplanes take great circle routes on long trips in order to save time and fuel.

A "projection" is a technique used by a cartographer to associate points on the surface of the earth with corresponding points on the surface of a plane. A number of projections are known, the familiar Mercator projection being but one example. But no single projection can accurately present the entire earth, or even a sizable part of it, on a flat map.

Another disadvantage in using traditional projection methods is that they produce geographical deformities or biases that hinder scholars researching the dynamics of celestial bodies, because of subconscious prejudices induced by flat representations. Flat representations tend to impede the work of scholars by undermining their judgement and ability to visualize not only the earth, but also other celestial bodies. Scale diversity on the flat maps is a particular problem encountered by scholars. To a pure geography scholar, it is practically useless to browse through current cartographic publications in a casual manner.

SUMMARY OF THE INVENTION

It is the object of the present invention to avoid the distortions that are inherent in flat maps, without the size and expense of globes.

Another object of the invention is to provide a technique for accurately depicting geographical features not only to students, but also to scholars in geographical studies.

A further object of the invention is to provide maps on surfaces which are curved but which have areas smaller than the area of a globe with the same curvature.

Yet another object of the invention is to provide a compact assembly of map posters having curved portions.

In accordance with one aspect of the invention, these and other objects of the invention can be attained by providing a set of map shells, each map shell having a curved portion which is configured as a spherical segment, the curved portions of the map shells having depictions of different geographical features. As used herein, the term "geographical feature" means a feature on the surface of any celestial body, not just our planet.

The map shells may have convex sides and concave sides, and means may be included for retaining the set of map shells in a compact assembly in which the compact side of at least one of the map shells faces the concave side of an adjacent map shells. The curved portions of the map shells may have different radii of curvature but they preferably all the same diameter. The map shells may be mounted on flat substrates to form map posters.

DESCRIPTION OF THE PREFERRED EMBODIMENTS

Figure 1:
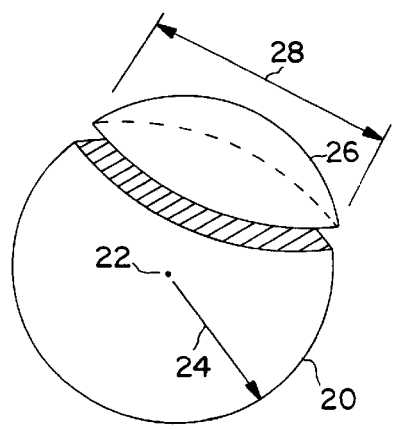
FIG. 1 is a perspective view showing a sphere and a spherical segment.
Figure 2:
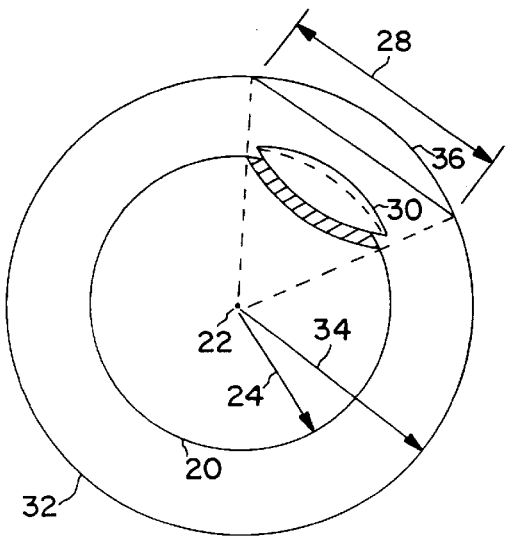
FIG. 2 is a perspective view illustrating an inner sphere and an outer sphere that is concentric with the inner sphere, with congruent spherical segments being taken from each of the spheres.
Figure 3:
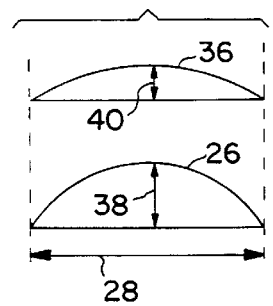
FIG. 3 is a side view illustrating the spherical segments shown in FIG. 1 and one of the spherical segments shown in FIG. 2.

To a close approximation, our earth has the shape of its sphere. There are indeed departures from the spherical shape, such as mountain ranges and an equatorial bulge due to the rotation of the earth, but these departures are relatively insignificant when compared to the total size of the earth. Geometrical concepts can therefore be successfully applied to the cartographer's art. FIGS. 1–3 are presented to facilitate the following exposition of geometrical principles that are employed by the present invention.

In FIG. 1, a sphere 20 having a center 22 and a radius 24 is depicted to represent the earth. This sphere 20 can be sliced by a plane (not illustrated) to isolate a spherical segment 26 having a diameter 28. The diameter 28 is the same as the diameter of the sphere 20 at the location of the slice. In FIG. 1, the area of the outer surface of the segment 26 is about 20% of the area of the surface of the sphere 20 (the surface area of a sphere with radius r is $4\pi r^2$, while the area of the curved surface of a spherical segment of height h is $2\pi rh$), so the segment 26 can carry with it a large-scale geometrical feature such as a continent.

For smaller geographical features, the slicing plane takes a shallower cut. FIG. 2 shows sphere 20 again, this time with a smaller spherical segment 30 sliced from it. It will be apparent that the area of the curved outer surface (hereafter simply the "surface area") of segment 30 is smaller than the surface area of segment 26, and also that the diameter of segment 30 is less than the diameter of segment 28.

Reference number 32 identifies a larger sphere about the center 22. The sphere 32 has a radius 34 that is larger than the radius 24 of sphere 20. Due to the greater radius, the spherical segment 36 is physically larger than spherical segment 30 even though the ratio between the surface area of segment 36 and the surface area of sphere 32 is the same as the ratio between the surface area of segment 30 and the surface area of sphere 20.

In FIG. 2, it will be seen that the radius 34 has been selected so that the segment 36 has the same diameter 28 as the segment 26 shown in FIG. 1. This point is illustrated in more detail in FIG. 3, which shows side views of segments 26 and 36. They have a common diameter 28. The segment 36, however, has a larger radius of curvature. Furthermore, the height 38 of segment 26 is greater than the height 40 of segment 36 even though the segment 36 has been sliced from a sphere with a larger radius.

Figure 4:
FIG. 4 is a side view illustrating a map substrate.
Figure 5:
FIG. 5 is a cross-sectional view of the map substrate shown in FIG. 4.
Figure 6:
FIG. 6 is a side view illustrating a map shell made from the map substrate shown in FIGS. 4 and 5.
Figure 7:
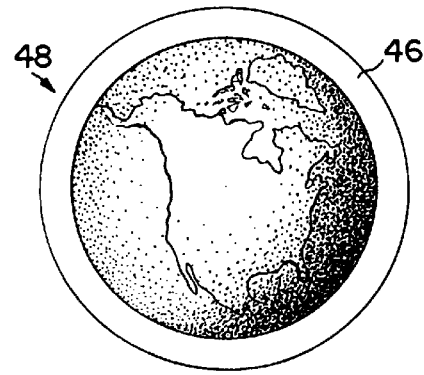
FIG. 7 is a top view of the map shell shown in FIG. 6.

With the foregoing background in mind, a first embodiment of the present invention will now be described with reference to FIGS. 4–15. FIG. 4 illustrates a side view and FIG. 5 illustrates a cross-section view of a hollow map substrate 42 having a portion 44 which is configured as a spherical segment and having a rim 46 surrounding the portion 44. The substrate 44 may be made by vacuum-forming a sheet of plastic, although other techniques such as injection molding can be used. The material employed need not be plastic, however; other materials such as sheet metal or felted fibers are suitable. A map is then deposited on the spherical segment portion 44 of the substrate 42 in order to form a map shell 48. The map is preferably printed using the rotogravure method, but other techniques such as screen printing may be used. Alternatively, map gores (not illustrated) may be adhesively attached to the substrate 42.

Figure 8:
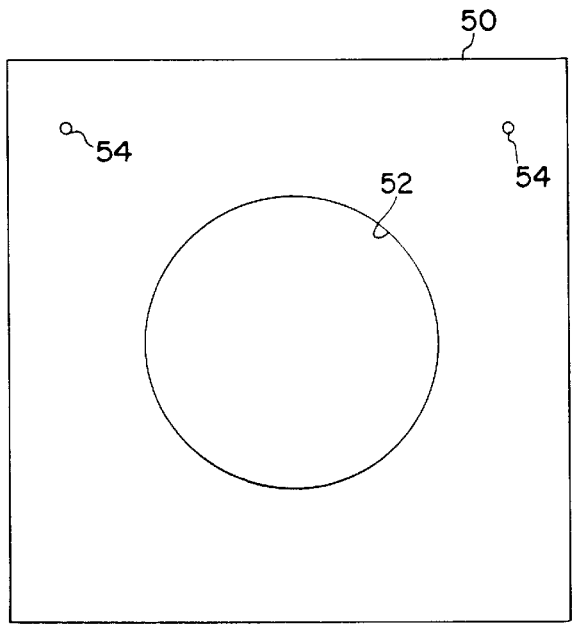
FIG. 8 is a top view of a support.
Figure 9:
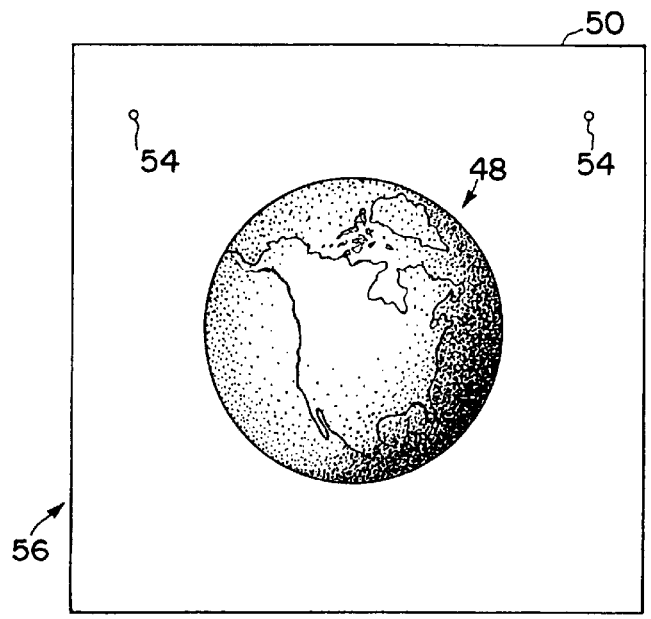
FIG. 9 is a top view of a map poster formed by mounting the map shell of FIG. 7 on the support of FIG. 8.
Figure 10:
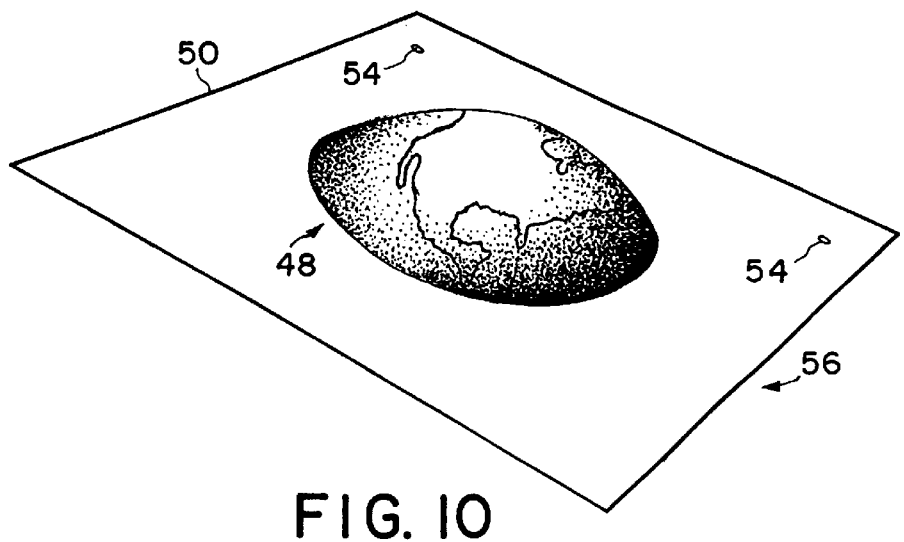
FIG. 10 is a perspective view of the map poster shown in FIG. 9.

FIG. 8 illustrates a flat support 50 having a circular opening 52 and mounting holes 54. A map poster 56 is made by depositing adhesive on rim 46 and then inserting the spherical segment portion 44 of the map shell 48 through opening 52, thereby firmly attaching the map shell 48 to the support 50. FIG. 9 shows a top plan view of the completed map shell poster and FIG. 10 shows a perspective view. The map poster shown in FIGS. 9 and 10 depicts the North American Continent.

Figure 11:
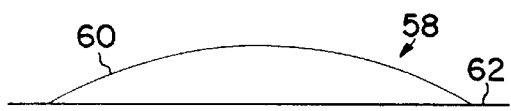
FIG. 11 is a side view showing another map substrate.
Figure 12:
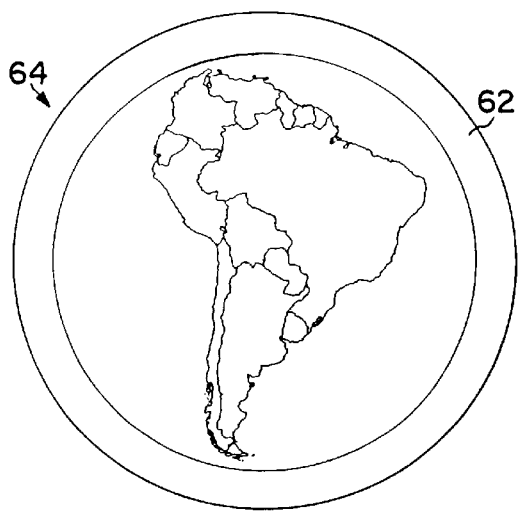
FIG. 12 is a top view showing a map shell made from the map substrate of FIG. 11.

FIG. 11 shows a hollow map substrate 58 having a spherical segment portions 60 and a rim 62. A map of South America is depicted on the spherical segment portion 60 to provide a map shell 64 as shown in FIG. 12. The map shell 64 is then mounted on a support 50 (see FIG. 9) to form another map poster.

Figure 13:
FIG. 13 is a side view showing a further map substrate.
Figure 14:
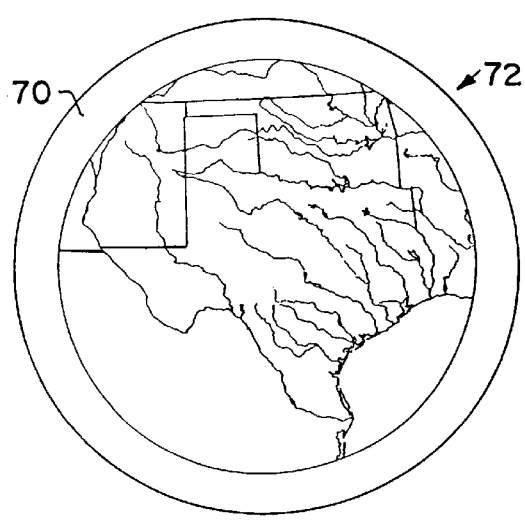
FIG. 14 is a top view of a map shell made from the map substrate of FIG. 13.

FIG. 13 illustrates a further map substrate 66 having a spherical segment portion 68 surrounded by a rim 70. It should be noted that spherical segment portion 68 has a diameter that is the same as the diameter of spherical segment 60 (see FIG. 11) and spherical segment 44 (see FIG. 4). A map of a smaller geographical region, in this case Texas, is depicted on spherical segment portion 68 to provide a map shell 72 as shown in FIG. 14. The map shell 72 is mounted on a support 50 (see FIG. 10) to provide another map poster.

In a similar manner, map posters are made for different geographical regions of interest. The diameters of the spherical segment portions are the same but the radii of curvature differ depending upon the size of the geographical features depicted. This is most apparent from FIGS. 11 and 13; South America, being larger than Texas, is presented on a spherical segment portion having a smaller radius of curvature than that for Texas.

Figure 15:
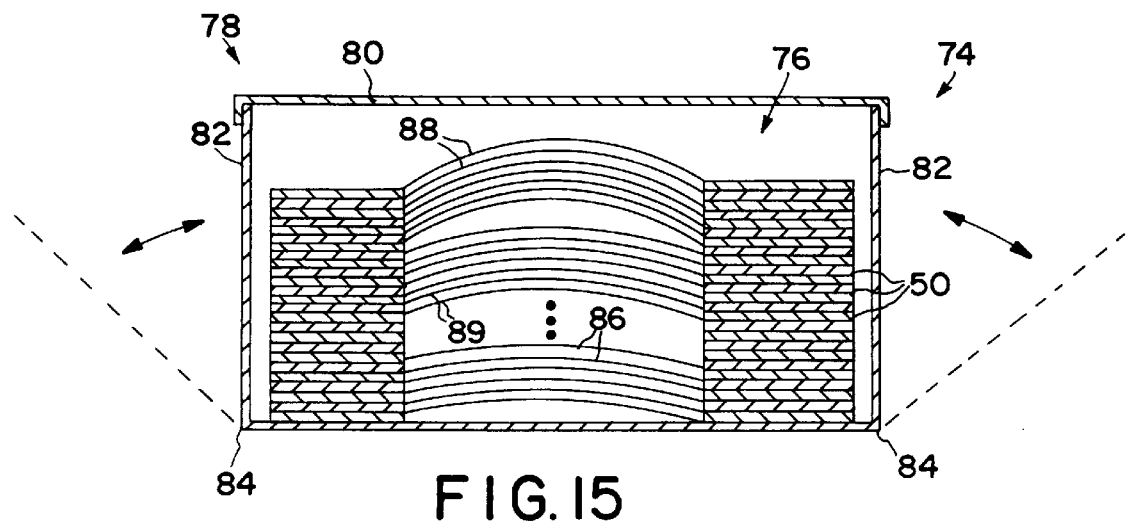
FIG. 15 is a sectional view of a teaching aid which includes a stack of map posters.

FIG. 15 illustrates a teaching aid 74 which includes an assembly or stack 76 of map posters inside a container or box 78 having a removable lid 80 and walls 82 which are hinged at corners 84. This permits the walls 84 to be folded outward as shown, after the lid 82 has been removed, to permit convenient access to the map posters in stack 76. The stack 76 has a lower end where map posters whose map shells have spherical segment portions 86 with a relatively large radius of curvature are located. These map posters depict small geographical regions such as states. At the top of the stack 76 are map posters whose map shells have spherical segment portions 88 with a relatively small radius of curvature. These map posters depict large geographical features such as continents. Between the top and bottom of stack 76 are map posters whose map shells have spherical segment portions 89 with an intermediate radii of curvature. Geographical features of intermediate size, such as countries, are depicted on these intermediate map posters. The three dots in FIG. 15 are intended to indicate that more map posters than shown may actually be present in teaching aid 74.

With continuing reference to FIG. 15, it should be noted that each map poster has a concave side and a convex side, and that the convex side of each map poster in the stack 76 faces the concave side of the next map poster in the stack. Depending upon the thickness of the supports 50 and the relevant radii of curvature, the convex side of a map poster may actually protrude into the concave side of the map poster above it. Because of this, a collection of map posters which depict geographical features without distortion can be compactly provided in a box 78 of modest size.

An instructor may use teaching aid 74 by selecting a desired map poster from box 78 and attaching it to the classroom wall with the aid of mounting holes 54. The students then have the benefit of a distortionless representation of the geographical feature of interest, without the size and expense of a globe. Furthermore, the radius of curvature of the spherical segment portion of the selected map poster inherently imparts to the student an indistinctive feel for the size of the geographical feature depicted on the selected map poster. A small radius of curvature means a large feature while a large radius of curvature means a small feature. That is to say, it is relatively easy for students to perceive how much of the earth (or other celestial body) is depicted on a particular map poster by gauging the radius of curvature.

It will be apparent that the teaching aid shown in FIG. 15 is susceptible to various modifications. One such modification would be to dispense with the box 78, and to provide a book of map posters by binding the stack 76 along one of its sides. Such a book might include only two map posters, each with a map shell for a hemisphere of the earth. In an open condition the two map posters would thus represent the entire globe, while in the closed position one map poster would fit within the other for compact shipping or storage.

Figure 16:
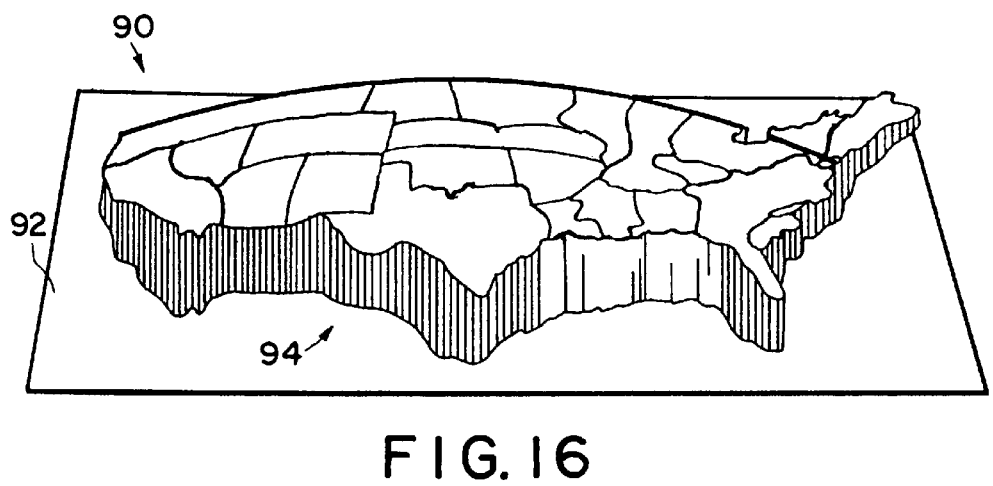
FIG. 16 is a perspective view of a map panel.

FIG. 16 illustrates another embodiment of the invention. In FIG. 16, a map panel 90 includes a substrate 92 and a raised map 94 protruding upward from the substrate 92. The raised map 94 is depicted on a spherical surface, but the periphery of the raised map 94 is not circular. Instead, the periphery is irregular and conforms to the border of the geographical feature of interest.

It will be understood that the above description of the present invention is susceptible to various modifications, changes, and adaptations, and the same are intended to be comprehended within the maining and range of equivalents of the appended claims.

What is claimed is:

1. A teaching aid, comprising:

a set of map shells, each map shell having a curved portion which is configured as a spherical segment, the curved portions of the map shells having depictions of different geographical features, wherein the curved portions of the map shells all have the same diameter, and wherein the set of map shells includes map shells whose curved portions have different radii of curvature.

2. The teaching aid of claim 1, wherein each map shell has a convex side and a concave side, and further comprising means for retaining the set of map shells in a compact assembly in which the convex side of at least one of the map shells faces the concave side of an adjacent map shell.

3. The teaching aid of claim 2, wherein each map shell is fixedly mounted on a respective map substrate having a flat surface from which the respective spherical segment protrudes.

4. The teaching aid of claim 1, wherein each map shell is fixedly mounted on a respective map substrate having a flat surface from which the respective curved portion protrudes.

5. The teaching aid of claim 1, wherein the set of map shells includes a plurality of first map shells which all have a common first radius of curvature.

6. The teaching aid of claim 5, wherein the set of map shells further includes a plurality of second map shells which all have a common second radius of curvature, the second radius of curvature being greater than the first radius of curvature, wherein each map shell of the set has a concave side and a convex side, wherein the map shells are disposed in a stack with their convex sides oriented upward, and wherein the first map shells are located higher in the stack than the second map shells.

7. A teaching aid, comprising:

a first map poster which includes a first flat substrate with a circular opening and a first map shell with a rim that is affixed to the first substrate adjacent the opening, the first map shell additionally having a curved portion which is configured as a spherical segment and which has a convex side and a concave side, the first map shell having a first geographical feature depicted on its curved portion;

a second map poster which includes a second flat substrate with a circular opening and a second map shell with a rim that is affixed to the second substrate adjacent the opening, the second map shell additionally having a curved portion which is configured as a spherical segment and which has a convex side and a concave side, the second map shell having a second geographical feature depicted on its curved portion, the second geographical feature being different from the first geographical feature; and means for supporting the first map poster adjacent the second map poster, with the convex side of the second map poster facing the concave side of the first map poster.

8. The teaching aid of claim 7, wherein the curved portions of the first and second map shells have the same radii of curvature and the same diameter.

9. The teaching aid of claim 7, wherein the curved portion of the first map shell has a larger radius of curvature than the curved portion of the second map shell, and wherein the curved portions of the first and second map shells have the same diameter.

10. The teaching aid of claim 7, further comprising a plurality of additional map posters each having a substrate and a map shell affixed to the substrate, the map shells all having different geographical features depicted on their curved portions, the curved portions all having the same diameter.

11. The teaching aid of claim 10, wherein the curved portions of a plurality of the map shells have a first radius of curvature and the curved portions of a plurality of map shells have a second radius of curvature that is larger than the first radius of curvature.

12. The teaching aid of claim 11, wherein the means for supporting comprises a box which holds the map posters in a nested stack, the map posters whose map shells have the first radius of curvature being higher in the stack than the map posters whose map shells have the second radius of curvature.

13. The teaching aid of claim 10, wherein the curved portion of at least one of the map shells has a first radius of curvature, the curved portion of at least one of the map shells has a second radius of curvature, and the curved portion of at least one of the map shells has a third radius of curvature, the first, second, and third radii of curvature being different from each other.

14. The teaching aid of claim 7, wherein the curved portions of the first and second map shells have equal diameters and the openings in the first and second substrates have equal diameters.

15. A map poster, comprising:

a flat map substrate having a front side and a back side, the substrate additionally having a circular opening therein; and a map shell having a rim which is affixed to the back side of the substrate adjacent the opening and having a portion which is configured as a spherical segment that protrudes through the opening in the substrate, a geographical feature being depicted on the spherical segment.

16. The map poster of claim 15, wherein the geographical feature is a geographical feature of the earth.

17. The map poster of claim 16, wherein the map shell has a convex side and a concave side.

18. A map panel for a geographical feature having an irregular border, comprising:

a substrate having a surface;

a raised member which protrudes from the surface of the substrate and which has an irregular periphery which substantially conforms to the border of the geographical feature, the raised member having a curved upper surface which is configured as part of the surface of a sphere, the geographical feature being depicted on the curved upper surface.

19. A teaching aid, comprising:

a set of map shells, each map shell having a curved portion which is configured as a spherical segment, each map shell additionally having a concave side and a convex side, the curved portions of the map shells having depictions of different geographical features, wherein the curved portions of the map shells all have the same diameter, wherein the set of map shells includes a plurality of first map shells which all have a common first radius of curvature and a plurality of second map shells which all have a common second radius of curvature, the second radius of curvature being greater than the first radius of curvature, wherein the map shells are disposed in a stack with their convex sides oriented upward, wherein the first map shells are located higher in the stack than the second map shells, and wherein the teaching aid further comprises a container for the stack of map shells, the container having a bottom on which the stack rests and a wall which is hingedly connected to the bottom so that the wall can be swung away from the stack, and a lid to retain the wall when the wall is in an upright position.

* * * * *